United States Patent
Biran et al.

(10) Patent No.: US 10,032,386 B2
(45) Date of Patent: Jul. 24, 2018

(54) METHOD FOR CARRYING OUT A REAL SITUATION SIMULATION TEST INCLUDING GENERATION OF VARIOUS VIRTUAL CONTEXTS

(71) Applicant: Airbus DS SAS, Elancourt (FR)

(72) Inventors: Herve Biran, Houilles (FR); Christophe Aube, Nancy (FR); Lionel Khimeche, Arcueil (FR)

(73) Assignee: Airbus Defence and Space SAS, Toulouse (FR)

( * ) Notice: Subject to any disclaimer, the term of this patent is extended or adjusted under 35 U.S.C. 154(b) by 402 days.

(21) Appl. No.: 14/898,957

(22) PCT Filed: Jun. 16, 2014

(86) PCT No.: PCT/FR2014/000134
§ 371 (c)(1),
(2) Date: Jun. 13, 2016

(87) PCT Pub. No.: WO2014/202844
PCT Pub. Date: Dec. 24, 2014

(65) Prior Publication Data
US 2016/0314703 A1    Oct. 27, 2016

(30) Foreign Application Priority Data
Jun. 17, 2013 (FR) ..................... 13 01407

(51) Int. Cl.
*G09B 9/32* (2006.01)
*G09B 9/00* (2006.01)
(Continued)

(52) U.S. Cl.
CPC .............. *G09B 9/003* (2013.01); *A42B 3/042* (2013.01); *G06T 3/005* (2013.01)

(58) Field of Classification Search
CPC .......................................................... G09B 9/32
See application file for complete search history.

(56) References Cited

U.S. PATENT DOCUMENTS 3,927,480 A    12/1975 Robertsson
4,040,744 A    8/1977 Schertz et al.
(Continued)

FOREIGN PATENT DOCUMENTS

FR    2521328    8/1983

OTHER PUBLICATIONS

International Search Report, dated Oct. 22, 2014.
"Stanag 3797 AO (Edidion 4)", Nato Standardized Agency, Apr. 29, 2009.

*Primary Examiner* — Omkar Deodhar
(74) *Attorney, Agent, or Firm* — Greer, Burns & Crain Ltd.

(57) ABSTRACT

A method for implementing a simulation test comprising generating a first simulation context comprising a display of a first portion of a first virtual environment defined over 360° on a screen, the portion being projected over an angle of 180° and an avatar generated at a GPS position in the virtual environment. A generation of a second simulation context is activated comprising retrieving the position of the head and its orientation from a sensor, generating a second portion of the first virtual environment computed according to the position and orientation of the captured head, displaying the second portion on an optical unit of the helmet. The first and second portions coincide over an angle corresponding to that of the second portion for at least one position and one orientation of the predefined head.

12 Claims, 2 Drawing Sheets

(51) Int. Cl.
  *A42B 3/04* (2006.01)
  *G06T 3/00* (2006.01)

(56) References Cited

U.S. PATENT DOCUMENTS

| | | |
|---|---|---|
| 4,091,412 A | 5/1978 | Salonimer |
| 4,600,305 A | 7/1986 | Priddy |
| 5,690,491 A | 11/1997 | Fitzgerald et al. |
| 5,751,259 A | 5/1998 | Iwamoto |
| 6,050,822 A | 4/2000 | Faughn |
| 2011/0023132 A1 | 1/2011 | Jelavic et al. |

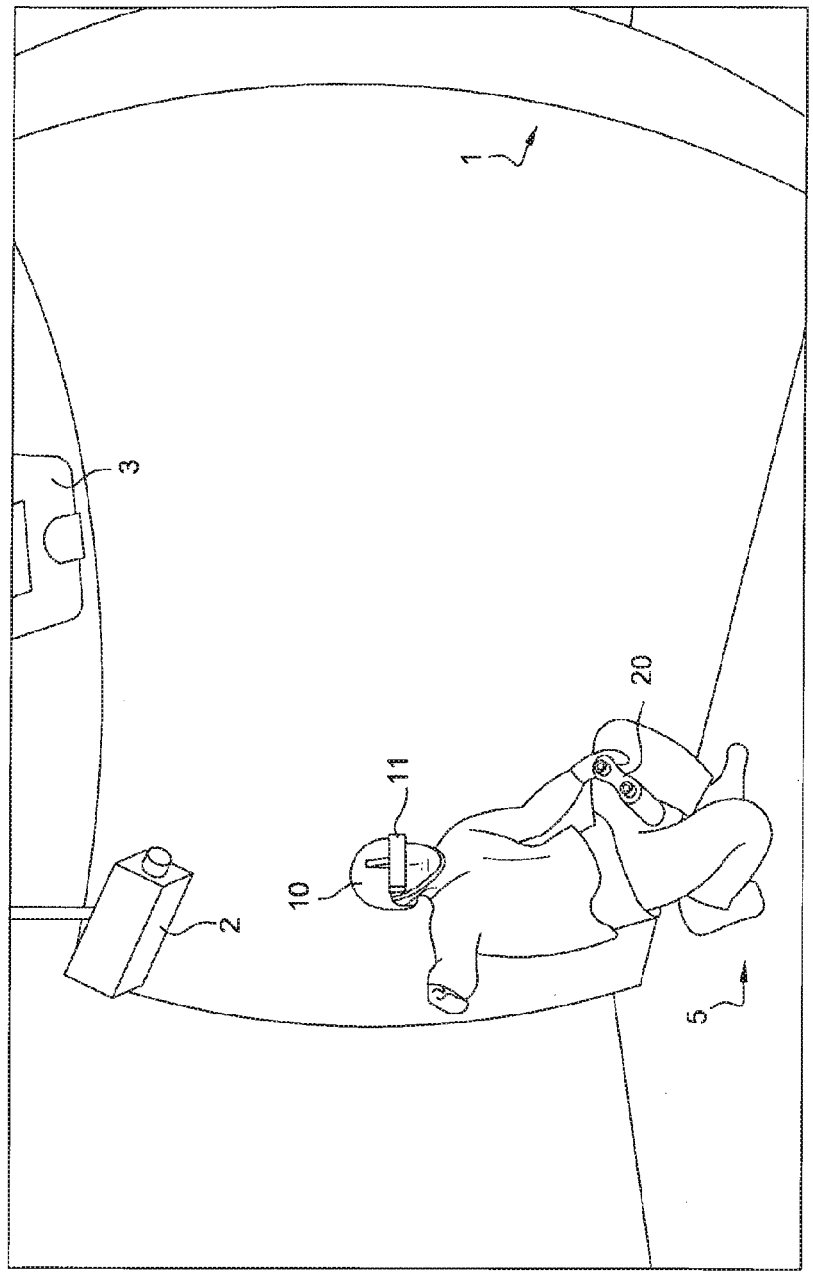

ered over a first angle of less than 300°;
METHOD FOR CARRYING OUT A REAL SITUATION SIMULATION TEST INCLUDING GENERATION OF VARIOUS VIRTUAL CONTEXTS

CROSS-REFERENCES TO RELATED APPLICATIONS

This application claims the benefit of the French patent application No. 1301407 filed on Jun. 17, 2013, the entire disclosures of which are incorporated herein by way of reference.

BACKGROUND OF THE INVENTION

The field of the invention relates to the methods and systems aimed at reconstituting an operational environment of a battlefield.

More particularly, the invention relates to a method for implementing a system for training a soldier who has to provide data relating to a target to be reached by a pilot of an aircraft.

At the present time, there exist various solutions for reconstituting an environment particular to an operational combat field for a soldier responsible for transmitting information relating to a target to be reached.

The soldier has a status of air controller on the ground, this status being designated by the acronym FAC, which means "forward air controller" (NATO). He assists one or more aircraft approaching an operational terrain in their mission to reach a target on the battlefield.

Generally, the FAC transmits the coordinates of the target to a pilot, who can for example arm his firing system on a designated target.

The FAC has various tasks, which consist of designating or illuminating a target and possibly assisting in the guidance of the aircraft or of a firing. He also gives authorization to fire from the ground.

Currently the qualifications required to train an FAC require a NATO certification (STANAG 3797) and numerous training sessions. Indeed, the task is performed in a critical environment, requires specific competences, and must be performed in a very short timeframe.

In this context, it is important to afford training of FACs in a virtual environment so as to use varied scenarios (outdoor operations, presence of civilians) and to reduce the real guidance operations with the mobilization of an aircraft and a pilot. One important requirement of simulators is that the FAC must be able to have a visual at all times on the identified target and on the aircraft, which may come from a position behind the FAC. Thus 360° vision is necessary.

There exist simulators for reconstituting a 360° operational environment but these are difficult to implement since they are very complex and expensive. In particular, there exists a solution that consists of reconstituting an entire dome comprising the implementation of a large spatial structure and an installation of complex video projectors. The 360° domes are very expensive and require many hours of installation, calibration and maintenance.

SUMMARY OF THE INVENTION

The invention aims to overcome these drawbacks.

One subject matter of the invention concerns a method for implementing a test simulating a real situation, and comprises:

generation of a first simulation context comprising a first display of:

a first portion of a first virtual environment defined over 360° on a semi-hemispherical screen, said portion being projected over a first angle of less than 300°;

an avatar (1) representing a first user in simulation, the avatar being generated at an emulated GPS position of the first user in the virtual environment;

activation of a generation of a second simulation context comprising:

retrieval of the position of the head and its orientation from a first capture device positioned on a helmet worn by the first user in simulation, generation of a second refreshed portion of the first virtual environment computed according to the position and orientation of the captured head, display of the second portion on an optical unit integrated in the helmet.

The first and second portions coincide over an angle corresponding to that of the second portion for at least one position and one orientation of the predefined head.

One advantage of the method of the invention is that it does not require a very large dome or screen. The user can benefit from various contexts generated according to the modes of use corresponding to a direct display of the screen or to the display of an image in an optical unit on a helmet. The mode of use of a helmet enables the user to obtain six degrees of total freedom enabling him to view a 360° image with 3 degrees in translation and 3 degrees in rotation.

According to one embodiment, the first angle is substantially 180°.

According to one embodiment, the method comprises an activation of a generation of a third simulation context comprising:

retrieval of the position of binoculars and their orientation from a second capture device positioned on binoculars held by the first user in simulation;

generation of a third refreshed portion of the first virtual environment computed according to the position and orientation of the captured head, the third portion corresponding to a portion of the second portion to which a magnification factor is applied, display of said third portion on an optical unit integrated in the binoculars.

This mode offers the user a third mode affording him 360° display of a magnified image.

According to one embodiment, the method comprises:

a first calibration that enables defining a spatial reference for making the first context and the second context match when the orientation of the head of the user intercepts the screen;

a second calibration that enables defining a spatial reference for making the first context and the third context match when the orientation of the head of the user intercepts the screen.

The calibration enables synchronizing the various contexts with the same spatial reference.

According to one embodiment, an administration of the first and second calibrations is performed via a remote server.

According to one embodiment, the activation of the generation of the second simulation context is activated by means of a joystick.

According to one embodiment, the activation of the generation of the third simulation context is activated by means of a calculator enabling comparing the proximity of the positions of the first and second capture devices with a reference threshold.

Another subject matter of the invention relates to a simulation system for implementing the method of the invention. It comprises in particular:

a semi-hemispherical screen for displaying a portion defined by a first context issuing from a first virtual environment defined over 360°;

at least two cross projectors each enabling displaying a half-portion of the image on each of the sides of the semi-hemispherical screen;

a first image generator and a second image generator, the images being generated from a first geolocation position defined in the virtual environment and a library of images stored in a memory;

the first image generator being capable of switching according to at least three contexts, each defining a portion of images of the virtual environment, all computed from the first geolocation position;

an actuator for switching from a first context to a second context;

a helmet comprising a first optical unit intended to display a second context refreshed according to the geolocation position and the orientation of the helmet;

binoculars comprising a second optical unit intended to display a third context refreshed according to the first geolocation position and the orientation of the binoculars;

at least one first capture device positioned on the helmet worn by the first user and a second capture device positioned on the binoculars, the positions and orientations of the helmet and binoculars being regularly transmitted to the first image generator;

a second image-generating device for computing the first context according to the first geolocation position coming from the first image generator, the first context thus computed being processed in order to be separated into two images each transmitted to one projector;

a device for administering the equipment, comprising a server for collecting data transmitted by the first image generator, the transmitted data comprising at least the first geolocation position.

According to one embodiment, the simulation system comprises a first display unit for displaying one of the three active contexts.

According to one embodiment, the administration device comprises a display unit for cloning the image displayed by the first display unit.

According to one embodiment the first and second position and movement capture devices comprise electromagnetic sensors.

According to one embodiment, the first and second position and movement capture devices comprise inertial sensors and ultrasound sensors.

According to one embodiment, the first and second position and movement capture devices comprise video sensors.

BRIEF DESCRIPTION OF THE DRAWINGS

Other features and advantages of the invention will emerge from a reading of the following detailed description with reference to the accompanying figures, which illustrate:

FIG. 2: a diagram of the system in which a user is in a position to work through his simulation task, according to the method of the invention.

DETAILED DESCRIPTION OF THE PREFERRED EMBODIMENTS

Figure 1:
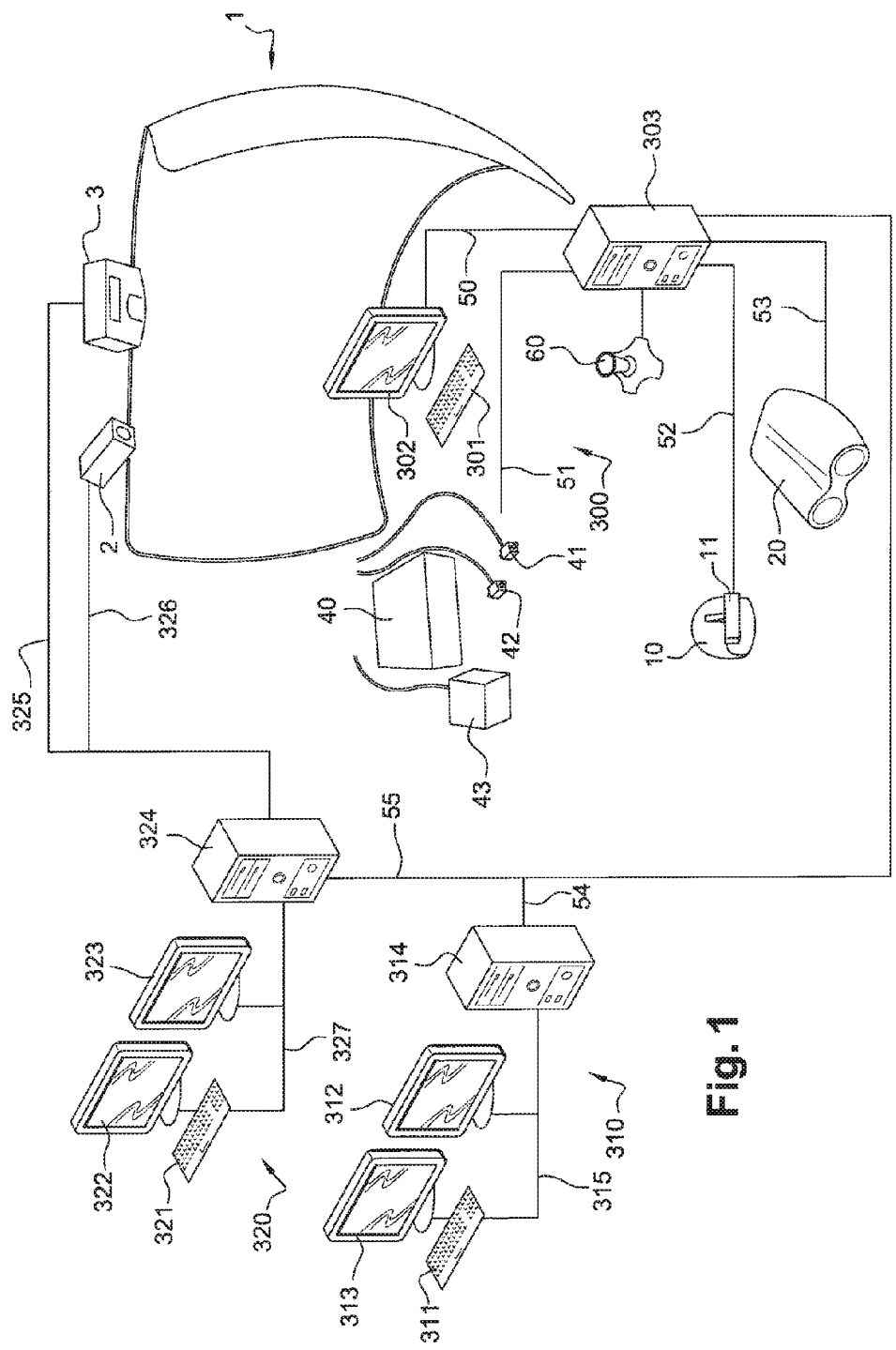
FIG. 1: a diagram of the system for implementing the method of the invention.

FIG. 1 depicts a simulation system of the invention comprising a first control device 300, a second control device 310, and a third control device 320.

Each of the control devices comprises a calculator for generating a first 360° virtual environment such as a program for generating a 3D video game.

In the remainder of the description the terms PC, calculator or image generator are used indifferently with regard to the equipment 324, 314 and 303, which may be one of these items of equipment or all three at the same time.

Projectors

The simulation system of the invention comprises a screen 1 forming a semi-hemispherical lateral band, at least two projectors 2, 3, each one enabling projecting an image onto a part of the screen 1. The display form may be configured so as to be of the WUXGA type, the acronym of which designates "wide ultra extended graphics array". This is a display unit standard corresponding to a wide UXGA, the definition of which is 1920×1200 pixels. With such a configuration, an angular resolution of the pixel of 5 minutes of angle per pixel can be ensured on average over the entire screen 1. At the center of the screen 1, a resolution may be obtained of less than 3 minutes of angle per pixel.

The visual on the screen 1 obtained by projection is optimized for a point of view situated at the center of the sphere that is blended with the semi-hemispherical lateral band on said screen portion 1.

Each projector comprises an optical unit having a lens with a wide angle of around 0.67:1, so as to avoid the generation of a shadow of a user 5 on the screen.

The invention allows arranging only two projectors substantially facing the screen and slightly oriented so as to display in the opposite diagonal images on the screen 1. The choice and configuration of the projectors allows preserving a good resolution on display.

The display of each projector covers the height of the screen 1 and extends substantially over a half-length. The two respective displays of the images projected in each of the two projectors are arranged substantially over a half-length of the screen 1 and form a single image constructed over the entire length of the screen 1.

An electronic compensation device may be used to deform the projected images so that they are displayed correctly on the semi-hemispherical screen 1. The electronic compensation device enables processing the image generated at the output of the projectors for adapting the necessary optical corrections. They are then arranged in a cut-through manner on the respective links 325 and 326 connecting each of the projectors 2, 3 to the image generator 324.

The electronic compensation device may comprise two independent housings situated upstream of the projector in order to deliver thereto the appropriate images to be projected.

Calibration of the display of the screen 1 may be performed before the launch of the simulation so as to adjust the arrangement of the projectors and the projection angles, the borders of displays on the screen 1, the adjustments of overlap in the central vertical band, and the corrections to be applied to the deformation of the image.

An overlap zone of the two images is acceptable on a vertical band situated substantially at the center of the screen 1. The overlap zone may correspond to a vertical band forming substantially an angle of 10° at the center of the screen 1. A correction method for correcting the edge effects of the image displayed at the center may be set up according to the method of the invention. The displayed image that results from the superimposition of two projected images that overlap may be rendered sharp and accurate by providing continuity with the two images projected on each side of the screen 1 by each of the projectors.

According to one embodiment of the invention, the third control device 320 comprises a calculator 324 such as a PC, a keyboard 321 and optionally two display units 322 and 323. The control station 320 comprises an image-generation device 324 for generating a first context from coordinates retrieved from the avatar in terms of position and orientation. The two display units 322 and 323 are optionally connected to the same image generator 324 by a link 327.

The two projectors are connected to the image generation device 324 by links 325, 326. The image generation device 324 provides generation of a first simulation context comprising a first display.

The PC 324 comprises the same version of the generator of the first virtual environment. The image generation devices 303, 314, 324 comprise the same map databases for emulating contexts issuing from the same first virtual environment.

The first context corresponds to a portion of the first virtual environment generated from a map database and location coordinates and orientation coordinates. The position and orientation coordinates of the avatar 1 are broadcast from the PC 303 to the PC 324 and 314, the first context may be reconstituted identically by each of the image-generation devices.

Consequently, the PC 324 is capable of generating the first context from the acquisition of the position and orientation coordinates of the avatar, for example by means of the connection 55.

The display units 322 and 323 respectively display a part of the display of the first context depicted on the screen 1.

The first simulation context corresponds to a representation of part of the first virtual environment. The first display comprises the representation of the first context. The first virtual environment is generated from a program, also referred to as software or game, for generating a 3D virtual environment defined over 360°.

User 1—FAC

The first control station 300 enables a user 5 to display a first context on a display unit 302. The image projected onto the screen 1 corresponds to this same first context.

The display unit 302 enables various contexts to be displayed and provides display of the context rendered active by the user 5. The display unit 302 is connected to the PC 303 thanks to a video link 300. Nevertheless, when the first context is no longer rendered active from the point of view of the user 5, the display of the first context is however maintained on the screen 1. The screen 1 enables offering a representation of the chosen first context to various users during the simulation so as to offer a constant view serving as a visual reference during the execution of the mission. Whatever the mode engaged by the user, the screen 1 always displays the first context.

When the first mode is active, the display unit 302 and the screen 1 show the same image of the first context. When the user 5 switches mode, the display on the screen 1 is fixed on the first context defined by the last position and orientation of the avatar chosen by the user 5.

The PC 303 enables management of the emulation of the geolocation coordinates and positioning of the avatar according to an orientation adjusted by means of the joystick 60 for example.

The calculator of the PC 303 is capable of taking into account the geolocation position of the avatar 1 and of generating the first context corresponding to a representation of a portion of the first virtual environment associated with this position with the consideration of an orientation data designating a direction. The first context displayed on the display unit 302 is therefore dependent on the orientation of the avatar. The orientation data may correspond to yaw information particular to a direction of the orientation of the avatar, particularly of his chest. This information may be transmitted and taken into account in the display of the image on the display unit 302. This data enables to perform a rotation of the avatar on the horizon line so as to be positioned facing a target for example. The direction of the chest allows free movement of the position of the head of the avatar 1. This solution enables obtaining a fixed stable image when the first context is displayed on the screen 1.

A link 55 enables synchronizing some data calculated by the PC 303 with the PC 324. Among these data, the position and orientation of the avatar in the first virtual environment enables generating a 180° display over the 360° according to a viewing angle centered on the avatar. This position and orientation information acquired by the PC 303 may be transmitted to the PC 324 so that the display of the screen 1 corresponds to the display of the display unit 302 when this display unit displays the first context.

The display unit 302 enables displaying the first context as well as practical information such as the position of the avatar and an orientation, optionally the time and other information being able to be superimposed on the image. Furthermore, the display unit 302 allows displaying the avatar of the user 5 in the foreground and customizing the display of the avatar 1, for example by adding or removing accessories.

According to one embodiment of the invention, the avatar 1 of the user 5 may be projected also onto the screen 1 in the foreground of the first context displayed. The avatar is generated at a GPS position retrieved from the PC 303 and emulated in the first virtual environment.

FIG. 1 also depicts all the elements of the system enabling the method of the invention to be implemented. The first control device 300 enables controlling the avatar and the view of the first context generated on the display unit 302.

In this first embodiment corresponding to the display of the first context on the display unit 302, a user 5 can choose an avatar that changes in said first environment. In particular, an actuator such as a joystick 60 allows various actions for making the avatar of the user 5 change in the virtual environment using the calculator of the PC 303, such as:

moving forwards and backwards;
using vehicles;
turning and/or changing orientation;
bending down, jumping;
adjusting the direction in which he is looking upwards, downwards;
fixing a position of the avatar and an orientation of the chest when the helmet is being worn or a specific action is activated;
using virtual equipment such as weapons, smoke generators, etc.

The position coordinates or the orientation coordinates may also be defined by means of a digital command; typically, at the start of a mission the avatar is generated at a defined position and is oriented along a default direction.

Furthermore, the avatar may move by means of a vehicle in the first virtual environment on the ground or in the air. The display unit 302 also enables displaying maps of the first virtual environment under different views. The use of maps enables obtaining a more general view of the environment and to switch from one view to another.

Furthermore, the PC 303 comprises a function of designating a target. This designation may be effected by the mouse directly on the display unit 302 by means of the retrieval of a pointer position and a direction. In this embodiment, the designation may also be made using a joystick 60.

The PC 303 also comprises a clock.

The display screen 1 enables displaying a portion of the 3D environment. For this purpose, a retrieval of the position, such as a GPS position in the first virtual environment of the avatar as well as an orientation, enables generating the display of a first context.

The first portion of the first virtual environment defined over 360° is partly projected over an angle of 180° on the semi-hemispherical screen 1 in a direction predefined by the user 5.

The display unit 302 enables continuously keeping the view that is reproduced on the screen 1 when an active simulation mode corresponds to the generation of the first context on the display unit 302. The display unit 302 is connected to the calculator 303, the latter comprising various output interfaces.

Among the output or input interfaces, a connection 54 allows exchanges of images for cloning the display of the display unit 302 in the display unit 312. A connection 55 enables transferring position and orientation data to the image generator 320 for projection on the screen 1.

Furthermore, the PC 303 comprises inputs/outputs 51, 52, 53 enabling:
  acquiring the orientation data coming from the movement and position capture devices 41 and 42 respectively positioned on the helmet 10 and on the binoculars 20;
  to transmit the images issuing from the contexts of the first virtual environment firstly to the optical unit 11 of the helmet 10 via the link 52 and secondly to the optical unit of the binoculars 20 via the link 53.

In the first mode, the user is free to activate his avatar in the first virtual environment; the display is centered on a direction of the chest of the avatar and independent of the movements of the head of the avatar. A keyboard 301 enables activating certain commands to move the avatar in the first context or to validate inputs such as the definition of a position or a course or to designate a target, for example with a mouse. The latter functions may be provided by a joystick 60.

The PC 303 comprises a calculator and a graphics card that are sufficiently powerful to generate the first context as well as the 3D movements of the avatar moving in the first context. The latter may, as previously stated, come from a video game with mappings coming from photographs of a real environment. The emulated coordinates of the avatar may be defined by GPS coordinates for example but also by MGRS coordinates, which is the standard system of geographical coordinates of NATO, the acronym of which designates "military grid reference system."

Instructor

According to one embodiment of the invention, a second control device 310 comprises a calculator 314 such as a PC, a keyboard 311 and optionally a mouse and two display units 312 and 313 connected to the calculator 314 by means of a link 315 enabling a video interface.

The PC 314 comprises the same version of the generator for the first virtual environment as well as the same mapping databases enabling emulating the first virtual environment as the PC 303 installed close to the user 3.

The control device 310 enables a second user, such as an instructor or pilot, to follow the situation of the avatar in the first context displayed on the display unit 302.

The control device 310 comprises various display units such as those depicted in FIG. 1: the display units 313 and 312.

According to one embodiment of the invention, a first display unit 312 displays the first displayed context generated by the PC 303; the image is cloned. The first display unit 312 enables switching the display from the first context to a second context such as the one generated in an optical unit of the helmet 11 detailed below when the user is wearing the helmet and activates the display of his visor integrated in the helmet.

Finally, this first display unit 312 also enables switching to a third context, such as the one generated in the optical unit of the binoculars 20 detailed below, when the user activates the vision of his binoculars.

A second display unit 312 enables generating a vision of an aircraft arriving close to a target pointed to by the user 5. Thus the instructor, but also the pilot in simulation, can keep a vision of the aircraft and that of the user 5 in order to guide him in his mission.

The instructor can therefore follow the first context in the display unit 302 as can be seen by the user 5 in the display unit 302.

A third display unit, not shown in FIG. 1, enables the instructor to display a mission administration tool. The administration tool enables beginning the mission and terminating it for example. This administration tool also enables activating the projectors 2 and 3.

Helmet

When the user 5 is wearing the helmet 10 and activates the integrated vision 11, a second context of the first virtual environment is generated in the optical unit of the helmet 10, and the user 5 enters a second mode. When the second mode is active, the display of the second context is also displayed on the display unit 302. Which allows a consistency of views locally between what is displayed in the optical unit 11 of the helmet 10 and in the display unit 302.

The instructor at the control station 310 can check what the user 5 sees and, if necessary, he can assist him, via the display unit 312 which shows a cloned image of the image displayed in the display unit 302.

On the other hand, when the switching from the first mode to the second mode is performed, the context display on the screen 1 corresponding to the first context is maintained.

The second context enables reducing the field of vision of the first virtual environment to a field of between 70° and 90° corresponding to a human field of vision.

The use of the helmet 10 and the generation of the second context allows avoiding the implementation of a screen of the dome type forming an igloo or bubble over 360° comprising a large number of projectors.

The integrated vision becomes active when the user 5 activates an actuator, for example by means of a joystick 60 or using a keyboard command 301. According to another embodiment, the second mode may be activated automatically when the user 5 activates the optical unit, for example by lowering the visor on his helmet 10.

Wearing the helmet enables the user 5 to obtain a second context corresponding to a restricted portion of the virtual environment defined at 360°, said portion being centered on an axis defined with respect to the helmet, such as for example that of the direction of the visor. Thus the user 5 can turn his back to the screen 1 for example and see a portion of the virtual environment not displayed on the latter screen 1.

The helmet 10 is provided with a first movement capture device 41 that enables knowing the position and the orientation data of the head according to the roll, pitching and yaw information. The position coordinates and orientation data of the head are transmitted to the calculator of the PC 303 for generating a refreshed second context in the optical unit 11 of the helmet 10.

The position of the helmet, and therefore of the head, retrieved by the PC 303 may be coupled to a position of the avatar so as to take into consideration the movements of the user 5 in three-dimensional space. When the position of the helmet is identified with respect to a reference position, for example that of the avatar, the calculator of the PC 303 processes only position differences vis-à-vis the position of a reference position.

Advantageously, the movement capture device 41 may be arranged on the top of the helmet and connected to the PC 303.

The first movement capture device 41 captures the data on orientation of the head in real time and transmits them regularly to the calculator of the PC 303 via a link 51. The link 51 may be wired or wireless.

The image displayed in the optical unit of the helmet is generated from a single channel obtained by means of the calculator of the PC 303 and the library of images corresponding to the loaded virtual environment.

The resolution of the image generated in the optical unit 11 of the helmet 10 may be of sufficient resolution to enable the user 5 to view an aircraft approaching and arriving at his back. The user 5 must be able to turn and assess a clear situation quickly. A resolution may for example be a resolution of 1280×720.

The user 5 can then recognize an aircraft arriving from a distant position.

The helmet 10 is advantageously used when the aircraft is approaching and the guidance of the aircraft requires the user 5 to keep it in sight during a short period of time.

A first calibration enables coordinating the GPS position of the helmet with that of the avatar. The calibration may be carried out automatically by the calculator of the PC 303, which may use the same positioning data in the first and second contexts. The GPS coordinates are the coordinates of the avatar in the first virtual environment.

A second calibration of the vision of the image generated in the optical unit 11 of the helmet 10 and that of the screen 1 may be performed at the start of the simulation task. The calibration is then performed for a given direction of the first context of the first virtual environment. The image projected onto the screen 1 and the image generated in the optical unit 11 of the helmet 10 are superimposed. When the user 5 is wearing the helmet, this calibration ensures consistency of the images with those displayed in the optical unit 11 of the helmet 10 and that projected onto the screen 1, in particular by:

superimposition of the images when the direction of the gaze of the user 5 intercepts the screen 1;

continuity of the images when passing from a direction of the gaze intercepting the screen 1 to a direction off the screen 1.

Binoculars

The system of the invention comprises binoculars 20 comprising an integrated optical unit capable of displaying an image generated by the calculator of the PC 303. The image generated also comes from the first virtual environment and corresponds to a third context.

When the user 5 is wearing the binoculars 2 and activates the integrated vision of the binoculars, a third context of the first virtual environment is generated in the optical unit of the binoculars 20, and the user 5 enters a third mode. When the third mode is active, the third context is also displayed on the display unit 302. Which enables consistency of the views locally between what is displayed in the optical unit of the binoculars 20 and in the display unit 302.

The instructor at the control station 310 can check what the user 5 sees and if necessary he can assist him, via the display unit 312 which depicts a cloned image of the image displayed in the display unit 302 and therefore those of the binoculars 20 in this third mode.

On the other hand, when switching from the first mode to the third mode, the context display on the screen 1 corresponding to the first context is maintained. This remains true when passing from the second mode to the third mode.

The binoculars 20 are provided with a second movement capture device 42 that enables determining the position and orientation data of the binoculars according to the roll, pitching and yaw information. The position coordinates and orientation data of the binoculars are transmitted to the calculator of the PC 303. The orientation data of the binoculars and its position in three-dimensional space are transmitted at regular instants to the calculator of the PC 303 so as to produce a third context controlled by the orientation of the binoculars. This enables displaying an image defined around a direction of the gaze in the virtual environment at 360°.

The third context corresponds to a portion of the first virtual environment defined on a small field of vision and magnified according to a magnification factor of the binoculars 20. For example, a magnification factor may be ×10. The magnification, depending on the embodiments, may be variable or adjustable on the binoculars.

The third context is generated in the optical unit of the binoculars 20, for example by means of an HDMI connection, which may be represented by the link 53.

The binoculars 20 are connected to the calculator of the PC 303 via a link for transferring the position and the orientation data of the movement capture device of the binoculars 20. It may be a wired link of the type depicted at 53 or a wireless link.

According to one embodiment of the invention, the positions of the first movement capture device 41 and of the second movement capture device 42 may be compared. When the two GPS positions of the two capture devices 41 and 42 are in a zone corresponding to a minimum distance threshold between the two devices, the third mode may be activated automatically and therefore the third context may be generated in the optical unit of the binoculars 20. Deactivation of the third mode may take place in the same way when the distance between the two capture devices exceeds a distance threshold.

When the user 5 is wearing the helmet 10, he can at any time use the binoculars 20 in order to obtain a view more suited to a distant recognition situation, for example in order to identify a target on the screen 1 or an aircraft arriving in the distance outside the area of the screen 1.

In concrete terms, when the binoculars 20 enter a zone close to the helmet 10, activation of the third mode no longer requires any specific manual action by the user 5.

Thus, in a very short period of time, the user 5 should be able to change from a "helmet" vision displaying a second context to a "binoculars" vision displaying a third context while minimizing the number of actions to be undertaken. The method of the invention enables rendering this switching of context independent of a manual action to be performed by the user 5 for example by means of an actuator. Indeed, the system of the invention ensures coupling of the two positions coming first from the helmet 10 and secondly from the binoculars 20. This coupling enables automatically activating the change from the second context to the third context and vice versa.

A first calibration enables superimposing the display of the binoculars to within any magnification on the display of the screen 1 so as to ensure continuity of the field of vision when the user 5 turns his head away from the screen 1 while the vision of the binoculars is active. This calibration enables the user 5 to position himself facing a target and to zoom it in the same direction while activating the vision of the binoculars. The third context generated in the binoculars therefore corresponds to the zoomed image in the same direction of the context screen 1.

The orientation data can be expressed so as to be offset with respect to a reference orientation calibrated vis-à-vis a defined direction of the first context displayed on the screen 1.

The binoculars 20 correspond to telemetry binoculars. A button on the top surface of the binoculars 20 enables displaying the azimuth. A second button enables displaying the distance from the targeted point. Pressing the two buttons at the same time displays the GPS or MGRS position of the targeted point.

Thus the calibration of the helmet and binoculars can enable defining a spatial reference so as to ensure continuity of the second and third contexts with the first context of the first virtual environment generated by the image generation devices of the PC 324 with the PC 303.

The administration tool of the PC 314 enables activating the calibrations of the spatial references, in particular it corresponds to a synchronization of images. Thus the instructor allows undertaking the calibration of the various contexts.

The PCs 324, 314 and 303 may be configured according to a client/server architecture. The PC 314 may be chosen as the server for enabling administration of the other two PCs.

Movement Capture Devices

According to one embodiment of the invention, the movement capture devices 41 and 42 may be electromagnetic sensors. In this embodiment, they comprise receivers 41 and 42 that are positioned in a magnetic field generated by an emitter 43. The positions and the orientation data are then transmitted to a box 40, then transmitted to the PC 303.

The operations of comparing positions of the two capture devices 41, 42 so as to automatically activate the third mode can be performed either by the box 40 or by the calculator of the PC 303.

Other movement capture devices may be used, such as inertial sensors or video cameras. Typically, inertial sensors in combination with ultrasound sensors can be used. Inertial sensors enable a good estimation of the orientation and ultrasound sensors enable obtaining a good estimation of the position. Video cameras enable capturing the position of a marker (generally white balls) situated in their field of view (for good precision several cameras are necessary). Because of this, the coupling of a system comprising the three types of sensor may constitute an alternative to the electromagnetic movement capture devices 41, 42.

FIG. 2 depicts a user 5 in simulation in front of a screen 1. The user 5 is wearing a helmet 10 and an optical unit 11, and the direction of his gaze is slightly oriented so as to look behind him. He is holding binoculars 20 ready for use.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for implementing a test simulating a real situation and comprising the steps:
   generating a first simulation context comprising a first display of:
      a first portion of a first virtual environment defined over 360° on a semi-hemispherical screen, said portion being projected over a first angle of less than 300°;
      an avatar representing a first user in simulation, the avatar being generated at an emulated GPS position of the first user in the virtual environment;
   activating a generation of a second simulation context comprising:
      retrieving the position of the head and its orientation from a first capture device positioned on a helmet worn by the first user in simulation,
      generating a second refreshed portion of the first virtual environment computed according to the position and orientation of the captured head,
      displaying said second portion on an optical unit integrated in the helmet,
   the first and second portions coinciding over an angle corresponding to that of the second portion for at least one position and one orientation of the predefined head.

2. The method for implementing a simulation test according to claim 1, wherein the first angle is approximately 180°.

3. The method for implementing a simulation test according to claim 1, further comprising the steps:
   activating a generation of a third simulation context comprising:
      retrieving the position of binoculars and their orientation from a second capture device positioned on binoculars held by the first user in simulation;
      generating a third refreshed portion of the first virtual environment computed according to the position and orientation of the captured head, the third portion corresponding to a portion of the second portion to which a magnification factor is applied,
      displaying said third portion on an optical unit integrated in the binoculars.

4. The method for implementing a simulation test according to claim 3, wherein:
- a first calibration enables defining a spatial reference for making the first context and the second context match when the orientation of the head of the user intercepts the screen;
- a second calibration enables defining a spatial reference for making the first context and the third context match when the orientation of the head of the user intercepts the screen.

5. The method for implementing a simulation test according to claim 4, wherein an administration of the first and second calibrations is performed via a remote server.

6. The method for implementing a simulation test according to claim 1, wherein the generation of the second simulation context is activated by means of a joystick.

7. The method for implementing a simulation test according to claim 3, wherein the generation of the third simulation context is activated by means of a calculator enabling comparing the proximity of the positions of the first and second capture devices with a reference threshold.

8. A simulation system for implementing the method of the invention, comprising:
- a semi-hemispherical screen configured to display a portion defined by a first context issuing from a first virtual environment defined over 360°;
- at least two cross projectors, each configured and arranged to display a half-portion of the image on each of the sides of the semi-hemispherical screen;
- a first image generator and a second image generator, the images being generated from a first geolocation position defined in the virtual environment and a library of images stored in a memory;
- the first image generator configured to switch, according to at least three contexts, each defining a portion of images of the virtual environment, all computed from the first geolocation position;
- an actuator configured to switch from a first context to a second context;
- a helmet comprising a first optical unit configured to display a second context refreshed according to the geolocation position and the orientation of the helmet;
- binoculars comprising a second optical unit configured to display a third context refreshed according to the first geolocation position and the orientation of the binoculars;
- at least one first capture device positioned on the helmet worn by the first user and a second capture device positioned on the binoculars, the positions and orientations of the helmet and binoculars being regularly transmitted to the first image generator;
- a second image-generating device configured to compute the first context according to the first geolocation position coming from the first image generator, the first context thus computed being processed so as to be separated into two images each transmitted to one projector;
- a device configured to administer the equipment, comprising a server configured to collect data transmitted by the first image generator, the transmitted data comprising at least the first geolocation position.

9. The simulation system according to claim 8, further comprising a first display unit for displaying one of the three active contexts.

10. The simulation system according to claim 9, wherein the administration device comprises a display unit for cloning the image displayed by the first display unit.

11. The simulation system according to claim 8, wherein the first and second position and movement capture devices comprise electromagnetic sensors.

12. The simulation system according to claim 8, wherein the first and second position and movement capture devices comprise inertial sensors and ultrasound sensors.

* * * * *